May 30, 1961 B. T. MATTHIAS 2,986,681
MONOCLINIC GLYCINE SULFATE AND ISOMORPHS
Filed Oct. 31, 1956
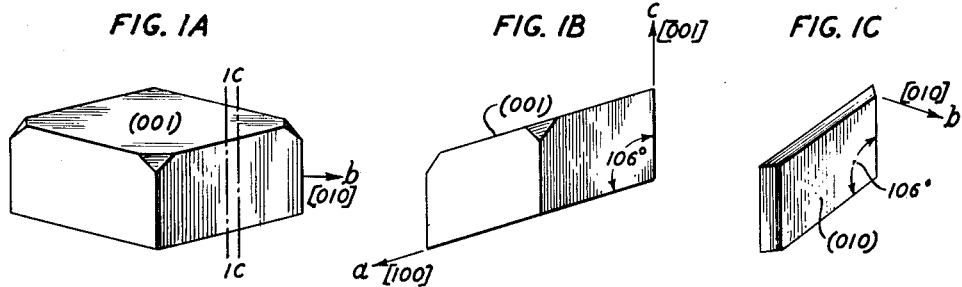
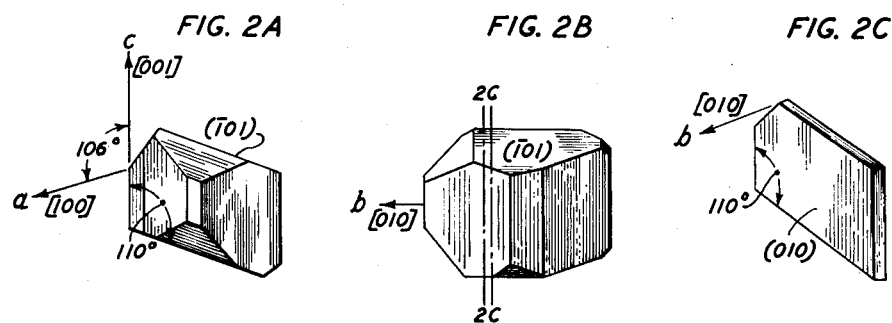
INVENTOR
B. T. MATTHIAS
BY
Harry C. Hart
ATTORNEY May 30, 1961   B. T. MATTHIAS   2,986,681
MONOCLINIC GLYCINE SULFATE AND ISOMORPHS
Filed Oct. 31, 1956   2 Sheets-Sheet 2

INVENTOR
B. T. MATTHIAS
BY
Harry C. Hart
ATTORNEY

United States Patent Office 2,986,681
Patented May 30, 1961

2,986,681

MONOCLINIC GLYCINE SULFATE AND ISOMORPHS

Bernd T. Matthias, Berkeley Heights, N.J., assignor to Bell Telephone Laboratories, Incorporated, New York, N.Y., a corporation of New York Filed Oct. 31, 1956, Ser. No. 619,463

1 Claim. (Cl. 317—262)

This application is a continuation-in-part of application Serial No. 603,072, filed August 9, 1956, and of application Serial No. 617,545, filed October 22, 1956, both now abandoned.

This invention relates to the preparation of a new sulfate of glycine which is ferroelectric, and to device applications of the same.

Ferroelectricity is a phenomenon associated with the spontaneous polarization of groups of electric dipoles in the crystal lattice so as to form electrically polarized domains. In the absence of external influences, these domains tend to be so arranged within the crystal as to substantially neutralize each other so that the crystal as a whole presents no substantial external electric field.

Application of an electric field to such a crystal, or a crystalline body composed of such crystals, causes growth of those domains having their direction of polarization most nearly aligned with the direction of the applied field at the expense of the other domains; and also causes some orientation, toward the direction of the field, of the direction of polarization within the domains that remain incompletely polarized in the direction of the field. The result is an over-all polarization of the crystal, or body of crystals, to which the field is applied. Removal of the applied field results in partial retention of a residual over-all polarization and partial restoration of domains having components of polarization in the reverse direction.

Heretofore crystalline materials classified in a number of different categories have been known to possess ferroelectric properties, and have accordingly been utilized as charge-storing elements in numerous computer and switching applications. However, the ferroelectric materials known in the prior art either lack certain desirable combinations of characteristics, or exhibit certain undesirable characteristics which hinder their optimum performance under specific operating conditions. For example, barium titanate, which exhibits a relatively shorter switching time than other ferroelectrics, is highly subject to decay, that is, to the loss of its stored polarization.

Accordingly, it is a principal object of the present invention to provide a new ferroelectric material of crystalline form having characteristics superior to those of the ferroelectric materials now known in the art; and more generally, to provide a new dielectric material.

This and other objects have been realized by the discovery of a new group of materials, consisting of monoclinic glycine sulfate and monoclinic glycine selenate, in their ordinary and deuterated forms, each of which has been tested and found to have highly desirable ferroelectric properties for certain purposes; and which constitute, as a group, materials ferroelectrically active over a wide range of temperatures of practical interest for possible device applications.

The first two materials, namely, monoclinic glycine sulfate and monoclinic glycine selenate, crystallized from ordinary water, were initially disclosed in the aforementioned application Serial No. 603,072, which relates in part to electrical devices embodying either or both of these materials as active elements.

In 1846 E. N. Horsford (Leibig's Annalen der Chemie, vol. 60, page 21) reported the production of "rectangular crystals" by the addition of sulfuric acid to a solution of glycine in alcohol. He reported the form of these crystals unchanged with a large excess of sulfuric acid. Subsequently (see Groth's Chemische Kristallographie, Engelmann, Leipzig, 1909, vol. 3, pages 92 and 99), the crystals were classified by Nickles as what is now known as orthorhombic and the composition determined to correspond to the formula

$$(CH_2NH_2COOH)_2H_2SO_4$$

This, the only previously known formula for glycine sulfate, was initially believed to be, and was stated in the aforesaid application Serial No. 603,072 to be, the formula for monoclinic glycine sulfate. Recent precise analytical experiments have indicated that the monoclinic form of glycine sulfate has a different chemical composition represented by the formula

$$(CH_2NH_2COOH)_3H_2SO_4$$

Correspondingly, the composition of the monoclinic selenate has been found to be represented by the formula

$$(CH_2NH_2COOH)_3H_2SeO_4$$

Monoclinic glycine sulfate of the composition specified in the foregoing revised formula is readily formed by crystallization from a solution of an excess of glycine and sulfuric acid in warm water. For optimum rate of crystal growth the reagents are preferably dissolved in proportions of three mols of chemically pure glycine to one mol of chemically pure, concentrated sulfuric acid. As the solution slowly cools transparent glycine sulfate crystals of monoclinic form are crystallized out which are, for the most part, of single crystalline structure. Isomorphous crystals of the corresponding selenate are similarly prepared.

Each of these crystals is particularly characterized by a cleavage plane perpendicular to its two-fold axis of symmetry. Elements cut with their major surfaces coincident with the natural cleavage planes of the crystals exhibit a maximum ferroelectric component in the thickness directions of the elements.

Such natural cleavage elements of monoclinic glycine sulfate and of the isomorphic glycine selenate are characterized by square, relatively narrow, electrostatic hysteresis loops.

The required coercive field for these elements is only approximately twenty percent or less of that required for small crystal elements of barium titanate, that is, they require a coercive field in the order of only 100 to 400 volts per centimeter.

The switching time for a memory unit employing such an element of monoclinic glycine sulfate lies between 1.5 and 50 microseconds. This is from one-tenth to one-half of the switching time required for guanidine aluminum sulfate hexahydrate, which forms the subject matter of my application Serial No. 489,193, filed February 18, 1955, now U.S. Patent 2,901,679, granted August 25, 1959. While barium titanate elements are characterized by a shorter switching time, i.e., of the order of one microsecond, the latter is subject to "decay," i.e., the loss of the polarization stored therein, whereas glycine sulfate and glycine selenate have been found to be free from "decay."

In addition, monoclinic glycine sulfate and its isomorphs have useful piezoelectric properties.

The Curie point, or transition temperature, above which monoclinic glycine sulfate, formed with ordinary water of crystallization, loses its ferroelectric properties and that of the corresponding monoclinic glycine selehas been ascertained to be 46.7±1 degrees centigrade;

nate, about 22 degrees centigrade. At the present time, no lower limit has been found, at which these crystals cease to exhibit ferroelectric properties.

As set forth in the aforementioned application Serial No. 617,545, the present inventor made the further discovery that when an excess of glycine and sulfuric acid are dissolved, not in ordinary water, but in deuterium oxide ($D_2O$), so-called "heavy-water," transparent monoclinic crystals, having similar structural and cleavage characteristics to those described above, are crystallized out of the solution. Moreover, in each case, these latter crystals have been found to exhibit a Curie temperature of 60 degrees centigrade. This represents a very substantial improvement in a fairly critical temperature range such that the material may be employed in apparatus which generates substantial amounts of heat without fear of temporary destruction of its properties.

It appears that the improved Curie temperature of this latter material is due to the substitution of a deuterium atom for one or more of the seventeen hydrogen atoms appearing in the foregoing revised formula for monoclinic glycine sulfate. This substitution, which is termed "deuteration," may in principle go to completion in any of the various radicals of the compound, resulting in one or more compounds which may be specifically identified by well-known spectroscopic techniques, and which are represented by a series of formulae which will be set forth in greater detail hereinafter. In accordance with the teachings of the literature, the final product of the deuteration technique, to be more specifically described hereinafter, is believed to be represented, in the main, by the formula

In a manner similar to that described in the foregoing paragraphs, monoclinic glycine selenate has also been prepared in deuterated form, producing a compound which is believed to be represented, in the main, by the formula

In the latter material, also, the deuterium substituents operate to raise the Curie temperature to about 34 degrees centigrade, as compared to 22 degrees for the corresponding compound crystallized with ordinary water.

The characteristics of these materials, in both their ordinary and deuterated forms, render them adaptable to a wide variety of practical applications. Among these may be mentioned use as piezoelectric devices, use as switching devices and use as memory storage devices for electrical computing circuits. For these purposes the materials monoclinic glycine sulfate and its disclosed isomorphs may be used in the form of bodies cut from single crystals or in polycrystalline elements.

Detailed descriptions of various important uses of devices using prior art ferroelectric materials are given, for example, in J. R. Anderson's Patents 2,695,396, 2,695,397 and 2,695,398, all granted November 23, 1954, and his Patent 2,717,372, granted September 6, 1955. Similar arrangements employing devices using monoclinic glycine sulfate or monoclinic glycine selenate, in both their ordinary and deuterated forms, as the ferroelectric material can be utilized in corresponding manners.

Additional objects, features and advantages of the present invention will become apparent during the course of the following description of illustrative embodiments and from the appended claim.

For the purposes of the description hereinafter, and the appended claim, the term "single crystal" will be employed to designate a single solid body throughout which the atoms are arranged in a substantially repetitive three-dimensional geometric pattern. This definition is extended to include single-crystal bodies characterized by twinning, as is common in ferroelectric and semiconductor crystal materials. (See, for example, page 186, 2nd paragraph, Dana's Textbook of Mineralogy, John Wiley, New York, 1932.) This definition excludes apparently single bodies, such as ceramics, formed from crystalline powders by sintering or any other means.

In the drawings:

Figs. 1A, 1B, and 2A, 2B illustrate in front elevation and side elevation crystals of monoclinic glycine sulfate and its isomorphs, in two typical crystal habits; and Figs. 1C and 2C respectively show typical ferroelectric elements which are sections cut as indicated on Figs. 1A and 2B, respectively;

Figure 3:
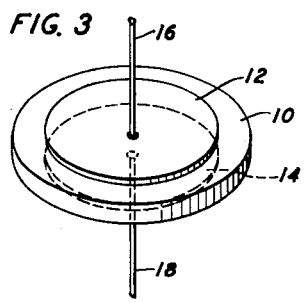
Fig. 3 illustrates in perspective an arrangement in which elements of one or more of the materials of the invention may be employed as a piezoelectric device or as a memory device.

Crystals of monoclinic glycine sulfate and monoclinic glycine selenate, in their ordinary and deuterated forms, constitute a new group of ferroelectric materials, the preparation and identification of which are the discoveries of the present inventor.

Glycine sulfate crystals of monoclinic form, and of a composition represented by the formula

are readily crystallized from a solution of sulfuric acid and an excess of glycine in warm water.

For optimum rate of growth, preferred proportions of the reagents are three mols of chemically pure glycine and one mol of chemically pure, concentrated sulfuric acid dissolved in warm water, the ratio of glycine to sulfuric acid being about 2.29 by weight. If dilute acid is used, this ratio is, of course, corrected for the assay of the acid. Only enough water is added to the nutrient solution to render it roughly saturated at the desired working temperature.

Typical solubility data for glycine sulfate

in warm water is given by the following table:

| Temperature: | Percentage by weight of glycine sulfate dissolved |
| --- | --- |
| 25° C | 29.2 |
| 45.1° C | 41.2 |
| 58.1° C | 51.1 |

Two specific numerical examples of typical quantities of reagents used in the preparation of monoclinic glycine sulfate crystals in accordance with the present invention are given as follows:

| Saturation temperature, °C | 45.1 | 58.1 |
| --- | --- | --- |
| Grams C.P., concentrated glycine ($CH_2NH_2COOH$) (Amend Drug & Chemical Co.) | 488 | 871 |
| Grams C.P., concentrated sulfuric acid ($H_2SO_4$) (Amend Drug & Chemical Co.) | 212 | 379 |
| Water _____liter | 1 | 1 |

In accordance with the established method for growing crystals from water solutions, a nutrient solution having a composition corresponding, for example, to one of the examples given in the foregoing table, is raised to slightly above the specified saturation temperature, then reduced slightly below saturation, and thereafter slowly cooled at the rate of about 0.41 degree centigrade per day, for about two weeks. Transparent crystals of monoclinic crystalline structure crystallize on the bottom of the container of supersaturated solution.

A convenient device for growing crystals of optimum size and structure, known as the Holden rotary crystallizer, is described in detail in U.S. Patent 2,484,829, granted to A. N. Holden on October 18, 1949. Monoclinic seed crystals, a few millimeters on an edge, formed in the manner described in the previous paragraph, are mounted in the hollow ends of the gyrator arms of the structure described in the Holden patent, supra. These are moved with a reciprocating motion in the nutrient solution to promote growth to the desired size.

Crystals of glycine sulfate derived by the foregoing process are transparent, monoclinic in form, and characterized by a density of 1.69 grams per cubic centimeter. They are ferroelectric in the range below the Curie point of 46.7±.3 degrees centigrade, and are also piezoelectric. Their sizes and habits vary in accordance with the period of growth, the volume of the nutrient solution, and the orientations of the seeds in the solution. Crystals measuring as large as several centimeters on an edge are not unusual; and two of these are indicated in front elevation, and in side elevation, in Figs. 1A, 1B and 2A, 2B, which show two typical habits of growth, among the many which characterize crystals in accordance with the present invention. The monoclinic crystalline structure of the present invention is characterized by two-fold symmetry about the $b$ axis, i.e., the [010] crystallographic direction. The most probable space-group of these crystals is denoted by $C_2^2(P2_1)$, using the accepted notations of Schoenflies and Hermann Mauguin.

As checked by X-ray goniometric measurements, the lattice constants of a unit cell of the material described above are: $a_0=9.15$, $b_0=12.69$, and $c_0=5.73$, all measured in Angstrom units to an accuracy of ±.03. The angle $\beta$ between the (001) and (100) crystallographic planes, as identified by Miller indices, is 105°40'±20'. The optic plane, parallel to the crystallographic plane ($\bar{1}02$), has been found to make an angle of approximately 93 degrees with the $c$ axis, i.e., the [001] crystallographic direction. The ($\bar{1}01$) and (100) crystallographic planes form an angle of 110°20'.

A most important finding, which contributes significantly to the adaptability of monoclinic glycine sulfate and its isomorphs to many types of device applications, is that natural cleavage planes exist parallel to the (010) crystallographic planes. Moreover, these natural cleavage planes are perpendicular to the ferroelectric axis, which is directed in the $b$ or [010] crystallographic direction. Accordingly, crystal elements similar to those indicated in Figs. 1C and 2C, which are ferroelectric in a thickness direction may be very simply and deftly cut from a suitable monoclinic single-crystal as indicated, for example, by the dotted sectional lines shown on Figs. 1A and 2B. The selected crystal is sliced along one of the (010) crystallographic planes, perpendicular to the $b$ axis, with a razor, or similar sharp cutting edge. Accordingly, the resultant element, as shown in Figs. 1C and 2C, is bounded in part by a pair of parallel major faces which are coincident with the (010) crystallographic planes to which the ferroelectric axis is perpendicular, whereby the latter is in the thickness direction in the element.

Monoclinic crystals of the isomorphic glycine selenate, which are similar in structure and ferroelectric properties to those described in the foregoing paragraphs, but which are characterized by a comparatively lower Curie temperature of 22 degrees centigrade, are readily prepared by a method which is in general similar to that described for the sulfate.

Corresponding to the previously described method, an excess of chemically pure concentrated glycine and chemically pure concentrated selenic acid are dissolved in warm water, preferably in the ratio of three mols of glycine to one mole of selenic acid. Inasmuch as selenic acid, sufficiently free of detectable traces of selenous acid, is not readily obtainable on the market, this reagent can be prepared in a form of more than 99 percent purity, which is suitable for the purposes of the present invention, by one of the methods well known in the art, such as that set forth in detail, for example, by Gilbert and King, Journal of the American Chemical Society, vol. 58, page 180 (1936).

Tests have shown that glycine selenate

$(CH_2NH_2COOH)_3H_2SeO_4$ dissolves to the extent of about 28 percent in water at room temperature (25 degrees centigrade).

Typical laboratory proportions of the reagents suitable for the preparation of monoclinic crystals of glycine selenate are given as follows:

| | |
|---|---|
| Grams of C.P. concentrated glycine ($CH_2NH_2COOH$) | 237 |
| Grams of C.P. concentrated selenic acid ($H_2SeO_4$) | 153 |
| Water | 1 liter |

The above proportions produce a saturated solution at about room temperature from which glycine selenate crystals are formed by allowing the solvent to evaporate. The rate of growth of these crystals is slightly longer than that for the isomorphic sulfate crystals.

Alternatively, larger and more perfect crystals can be formed in the Holden rotary crystallizer, as taught with reference to monoclinic glycine sulfate.

As indicated earlier in the specification, crystals of deuterated glycine sulfate may be prepared by crystallization from a solution of the two principal reagents, an excess of glycine and sulfuric acid, in heavy water. To minimize the dilution of the deuterium atoms of the heavy water by hydrogen atoms, the reagents should preferably be employed in concentrated form. For most rapid crystal growth the reagents should be dissolved in proportions of 3 mols of glycine to 1 mol of sulfuric acid. One way in which to assure exactly correct proportions is to dissolve, in heavy water, crystals of ordinary monoclinic glycine sulfate, earlier formed by crystallization from an ordinary water solution, in which the proportions are already correct.

After the crystals have been thoroughly dissolved in the heavy water, which may be warmed for the purpose, it may be cooled, whereupon deuterated glycine sulfate is crystallized out of the solution. At the price of a somewhat greater elapse time for the entire operation greater assurance can be had of uniformity of the resulting crystal structure by evaporating the solution at constant temperature.

Thus in one particular example, chemically pure glycine and chemically pure sulfuric acid, obtained from Amend Drug and Chemical Co., were dissolved in ordinary water in the proportions of 3 mols of glycine to 1 of sulfuric acid and in quantities to saturate the solution at a temperature of 60° centigrade. This solution was stirred vigorously until thoroughly mixed and was then set aside to cool. As it cooled it became supersaturated and monoclinic glycine sulfate was crystallized out of the solution, the crystals forming on the inner surface of the vessel. The composition of these crystals was ordinary monoclinic glycine sulfate.

These ordinary monoclinic glycine sulfate crystals were then dissolved to saturation in 100 cc. of deuterium oxide at 25° centigrade. The solvent was of 99.5 percent purity, obtained from the Stuart Oxygen Co., San Francisco, Calif. A single one of these crystals, measuring a few millimeters on an edge, was now suspended, as a seed, above the bottom of the vessel containing the heavy water; and the solution, with its seed crystal, was then set aside to evaporate without change of temperature. As the evaporation proceeded and the solution became supersaturated, crystallization of deuterated glycine sulfate took place on the seed crystal of ordinary glycine sulfate. When the evaporation was nearly complete it was found that after an elapsed period of about two weeks, the suspended seed crystal had grown to a large size by accretion of deuterated glycine sulfate.

Large crystals several inches in minimum dimension are readily prepared in this simple manner.

Deuterated crystals of monoclinic glycine selenate have been prepared by a similar process.

Except for the raised Curie temperatures (about 60 degrees centigrade for the sulfate and 34 for the selenate) the physical and electrical properties of these crystals are substantially similar to those previously described for monoclinic glycine sulfate.

As previously stated, it appears that the improved Curie temperature of the new material is due to the substitution, in the chemical formula given above, of a deuterium atom for one or more of the seventeen hydrogen atoms. This substitution, which is termed "deuteration," may in principle go to completion in any of the various radicals of the compound, resulting in the formulae:

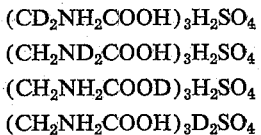

$(CD_2NH_2COOH)_3H_2SO_4$ $(CH_2ND_2COOH)_3H_2SO_4$ $(CH_2NH_2COOD)_3H_2SO_4$ $(CH_2NH_2COOH)_3D_2SO_4$

In principle, a partial substitution may also take place. Thus, in the last case, if the substitution be incomplete, the formula becomes

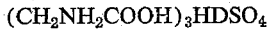

$(CH_2NH_2COOH)_3HDSO_4$

Employment of the reagents, sulfuric acid and glycine, in concentrated form, in an excess of heavy water, tends to make for complete substitutions instead of partial ones.

The substitution of deuterium atoms for the two hydrogen atoms bonded to the carbon atom, represented by the first of the foregoing formulae is a difficult one. To the contrary, the basic radical $NH_2$ and the two acid radicals COOH and $H_2SO_4$ are readily dissociated in solution, so that the substitutions of the second, third and fourth formulae are more readily effected. Especially when the glycine and sulfuric acid are in concentrated form and are dissolved in a large excess of heavy water, the probability is that the substitution takes place in eleven out of the seventeen possible cases. Hence the constitution of the final crystal is most probably represented, in the main, by the formula:

$(CH_2ND_2COOD)_3D_2SO_4$

The exact constitution of the final product may be determined through infrared spectroscopic techniques.

Without necessarily subscribing to any particular theory it is believed probable that the elevation of the Curie point of deuterated glycine sulfate as compared with the Curie point of ordinary glycine sulfate is due to the greater mass and therefore greater inertia of each dueterium atom of the former as compared with the corresponding hydrogen atom of the latter. Inasmuch as the Curie point represents the breakdown, under the influence of thermal energy, of an ordered pattern among the atoms of the substance, it is reasonable to suppose that, the greater the inertia of any such atom, the greater the thermal energy required to disorder the pattern.

It will be apparent to those skilled in the art that the piezoelectric and ferroelectric properties of the materials of the present invention, particularly the latter, uniquely adapt them for numerous types of device and circuit application. For example, it will be recalled that when a potential difference, at 60 cycles per second, in excess of the coercive force is applied across the thickness of natural cleavage elements of the type described with reference to Figs. 1C and 2C, an exceptionally rectangular hysteresis loop is apparent. These crystals are characterized by a coercive field, of the order of 100 to 400 volts per centimeter, and a switching time of 1.5 to 50 microseconds. Furthermore, it has been found that the stored charge is relatively free from decay.

Accordingly, a few novel device applications of the material of the present invention will be described by way of illustrative example. Many others will occur to those skilled in the art.

Referring in detail to Fig. 3, a novel dielectric element, or body, of the present invention is shown in the shape of a thin circular disc 10. Preferably, disc 10 is cut from a monoclinic single crystal of any one of the disclosed isomorphic materials, such as, for example, deuterated glycine sulfate, and preferably with one of its crystallographic axes substantially parallel with the thickness direction of the crystal. For use as a piezoelectric device as in Fig. 3, any of its three major crystallographic axes as in Fig. 3, any of its three major crystallographic axes a, b or c, as indicated in Figs. 1A, 1B and 2A, 2B, may be chosen to be substantially parallel to the thickness direction. For uses involving the ferroelectric characteristics of the element, i.e., for use as a memory storage device, et cetera, the ferroelectric axis of the crystal should be substantially parallel to the thickness dimension of the element. As previously described with reference to Figs. 1A, 1B, 1C and 2A, 2B, and 2C, the ferroelectric axis is perpendicular to the natural cleavage planes of the crystal, which are parallel to the (010) crystallographic planes.

Alternatively, the disc 10 may be formed from a polycrystalline body of one of the disclosed isomorphic materials.

Convenient dimensions, by way of example, for the disc 10 of Fig. 3 are 1.5 centimeters in diameter and 1.5 millimeters in thickness. Its resonance as a piezoelectric vibrating device is determined by its orientation with respect to the crystallographic axes of the crystal from which it is cut as well as by its physical dimensions and the temperature at which it is operated. Units of this type can be conveniently designed to operate at frequencies within the range of from fifty kilocycles to several megacycles.

To facilitate the application of electric fields to element 10 in the direction of its thickness dimension, adherent metal coatings, comprising electrodes 12 and 14, are applied, by any of several methods well known to those skilled in the art, to its upper and lower surfaces, respectively. Lead wires 16 and 18 are electrically connected to electrodes 12 and 14, respectively, by suitable means, as for example, by soldering.

When the device of Fig. 3 is used as a piezoelectric element, it is operated while subjected to a constant direct-current biasing field. When subjected to such a field, the body 10 exhibits piezoelectric properties in that it changes in physical size in response to changes of a potential applied across the body in a direction having a component parallel to the direction of the biasing field, and in that, when subjected to mechanical stress, it generates a potential, in the direction of the biasing field, which varies with variations in the applied stress. The effectiveness of the piezoelectric element increases as the superimposed steady electric field is increased.

The steady biasing field for piezoelectric use may be established by maintaining a steady voltage across the electrodes 12 and 14 while the device is in use. A similar result can be achieved by subjecting the ferroelectric body to a high, steady potential gradient for a substantial period of time prior to use. Upon removal of this potential a residual, or remanent, polarization remains in the body which can be used in lieu of the above-mentioned steady biasing field, thus obviating the necessity of supplying the externally applied biasing field.

The residual, or remanent, polarization may be obtained more rapidly and effectively if the material is heated to a temperature above its Curie point, and is then allowed to cool to a temperature below its Curie point under the high, steady potential gradient.

For polarization at room temperature potential gradients of between 20,000 volts, or more, per centimeter and about 5,000 volts per centimeter for durations of a few minutes at the steep gradient and of several hours at the lesser gradient should be employed. If the material is raised to a temperature above its Curie point and allowed to cool while the gradient is applied to it, the time for which the gradient is applied is not a significant factor in the process.

The device of Fig. 3, commonly referred to as a ferroelectric condenser, when operated with an adequate direct-current bias either externally applied, or resulting from remanent polarization of the body 10, may be used for any of the varied and numerous purposes for which prior art piezoelectric devices have been employed. Outstanding uses of piezoelectric devices are, as is well known to those skilled in the art, for frequency control and for electromechanical wave filters or related frequency selective devices. Other common uses are for electromechanical transducers, microphones, telephone receivers, phonograph pickups, relays and the like.

Figure 4:
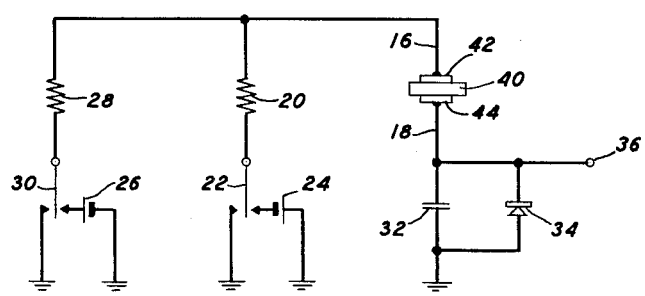
Fig. 4 shows, in schematic diagram, a basic memory circuit employing a ferroelectric element similar to that of Fig. 3.

Fig. 4 illustrates diagrammatically the basic circuit for the storage of the binary digits "1" and "0." Disc 40 can be substantially one-tenth the diameter and thickness of disc 10 of Fig. 1, if disc 40 is to be used solely as a single storage or memory unit. Disc 40 is preferably prepared, in the manner previously described with reference to Figs. 1C and 2C as a natural cleavage element from a monoclinic single crystal of one of the disclosed materials. Electrodes 42 and 44 are proportioned appropriately for disc 40. Disc 40 with its electrodes may also obviously be considered as a condenser having a ferroelectric dielectric. A larger ferroelectric element, obviously, may be employed to form a storage matrix for several hundred information "bits" substantially as illustrated, for example, in Fig. 4 of J. R. Anderson's Patent 2,695,398, granted November 23, 1954. Leads 16, 18 are as described above in connection with Fig. 1. Lead 18 connects to capacitor 32 and to output terminal 36, to which a utilization circuit, not shown, is to be connected. The other terminal of capacitor 32 is grounded. A diode 34 suitably of germanium or copper oxide is connected across, i.e., in shunt with, capacitor 32, as shown.

Positive or negative voltage pulses may be applied to the body 40 from battery 26 or battery 24 by momentarily closing switch 30 or switch 22, respectively, to the right. In practical applications batteries 26 and 24 will usually be pulse generators. Resistors 28 and 20 in series with switches 30 and 22, respectively, suitably limit the power supplied to the circuit including body 40.

Figure 5:
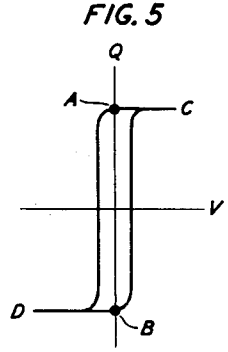
Fig. 5 illustrates diagrammatically the electrostatic hysteresis characteristic of a ferroelectric element or body such as shown in Figs. 1C, 2C, which is utilized in explaining the operation of the circuit of Fig. 4.

Assuming that a positive pulse has initially been applied to drive the body 40 to its positive saturation polarization, corresponding, for example to point C of Fig. 5, upon termination of the pulse the polarization will return to its remanent value, corresponding, for example, to point A of Fig. 5. No external charge remains on electrodes 42, 44, but the remanent polarization A persists within the body 40, while the voltage across the body has returned to zero. It is assumed, further, that a negative pulse corresponds to the binary digit "1," and no pulse corresponds to the digit "0."

If a negative pulse is now applied to the body 40, equal in magnitude to the above-mentioned initial positive pulse, the body 40 will be driven to its negative saturation polarization, corresponding, for example, to point D of Fig. 5; and at the termination of the pulse the body 40 will return to its remanent negative polarization value, corresponding, for example, to point B of Fig. 5.

Diode 34 provides a slow leak for the charge established in capacitor 32 by the initial positive pulse and a virtual short circuit of capacitor 32 for the negative applied pulse.

The binary digit "1" is now stored as the remanent negative polarization (point B of Fig. 3) in body 40 and will remain stored therein for several days without substantial loss.

To read it out as a voltage pulse at output terminal 36, the positive pulse source is operated, as described above for the initial positive pulse, reversing the polarization of body 40 from point B of Fig. 5 to point C of Fig. 5, the polarization receding to point A of Fig. 3 upon termination of the pulse. During the read-out pulse a positive voltage appears at terminal 36 and only slowly disappears because diode 34 is of high impedance for this polarity.

The series connection of the condenser including body 40 and capacitor 32 may be regarded as a voltage divider for the applied pulse whether positive or negative. The fraction of either pulse appearing at terminal 36 is determined by the relative capacities of capacitor 32 and the condenser including body 40 when the pulse is positive (read-out), and by the relative impedances of diode 34 and the condenser including body 40 when the negative storage pulse is applied. In the latter case, the output pulse at terminal 36 is negligible in comparison to that provoked by the read-out, or positive, pulse. Numerically equal pulses are suitable for the initial conditioning, for the storage of digit "1" and for reading out the digit. As indicated above, pulse durations of from 1.5 to 50 microseconds will suffice, where the body 40 is of monoclinic glycine sulfate or one of its disclosed isomorphs.

The convention usually adapted, that a negative pulse stores digit "1" and no pulse corresponds to digit "0," means that a negative pulse reverses the remanent polarization of body 40 from point A to point B of Fig. 5, while digit "0" corresponds to no pulse and leaves the polarization at point A. Accordingly, a positive read-out pulse applied to the ferroelectric element 40 when polarized at point A of Fig. 3 results only in the production of an insignificantly small pulse at terminal 36, positive to ground.

Fig. 5 as mentioned above illustrates the electrostatic hysteresis loop of the ferroelectric element 40, the significance of points A, B, C and D, respectively, being as described in detail above. This loop can be conveniently displayed on a cathode ray oscilloscope screen, a suitable circuit for the purpose being that described by C. B. Sawyer and C. H. Tower in the article entitled "Rochelle Salt as a Dielectric" published in the Physical Review, volume 35 at page 269, 1930, or by any of several other arrangements well known to those skilled in the art.

Numerous and varied other uses and arrangements involving devices and principles of the present invention will readily occur to those skilled in the art. The above described arrangements are illustrative, but by no means exhaustively cover all uses and arrangements of the invention.

What is claimed is:

An element of single-crystalline structure cut from a monoclinic crystal of material selected from the group consisting of glycine sulfate and glycine selenate in their ordinary and deuterated forms, wherein the major bounding planes of said element are parallel to the (010) planes in said crystal, whereby the ferroelectric axis is parallel to the thickness direction of said element and perpendicular to said major bounding planes.

References Cited in the file of this patent

UNITED STATES PATENTS

| | | |
|---|---|---|
| 2,306,555 | Mueller | Dec. 29, 1942 |
| 2,717,372 | Anderson | Sept. 6, 1955 |
| 2,901,679 | Matthias | Aug. 25, 1959 |

OTHER REFERENCES

Horsford: Liebig's Annalen Der Chemie, vol. 60, pp. 21–3, 1846.

Bok et al.: Chem. AB, vol. 47, page 6744, 1953.

Holden et al.: Physical Review, vol. 98, p. 546, No. 2, April-June 1955.

Matthias et al.: Phy. Review, vol. 103, p. 262, July 1, 1956.

Organische Chemie (Beilstein), Band 4, System No. 323–449, p. 340.